US012298927B2

(12) United States Patent
Hull et al.

(10) Patent No.: US 12,298,927 B2
(45) Date of Patent: May 13, 2025

(54) SELECTABLE INPUT BUFFERS OF GENERAL PURPOSE INPUTS AND MICROCONTROLLERS HAVING THE SAME (71) Applicant: Microchip Technology Incorporated, Chandler, AZ (US)

(72) Inventors: Richard L. Hull, Puyallup, WA (US); Voltaire Ganchorre, Puyallup, WA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/946,500

(22) Filed: Jun. 24, 2020

(65) Prior Publication Data
US 2020/0409879 A1    Dec. 31, 2020

Related U.S. Application Data (60) Provisional application No. 62/867,553, filed on Jun. 27, 2019.

(51) Int. Cl.
G06F 13/20    (2006.01)
(52) U.S. Cl.
CPC .......... *G06F 13/20* (2013.01); *G06F 2213/40* (2013.01)
(58) Field of Classification Search
None
See application file for complete search history.

(56) References Cited

U.S. PATENT DOCUMENTS

| 3,654,394 | A | 4/1972 | Gordon |
| 4,577,149 | A | 3/1986 | Zbinden |
| 5,151,620 | A | 9/1992 | Lin |
| 5,552,627 | A | 9/1996 | McCollum et al. |
| 5,717,343 | A | 2/1998 | Kwong |
| 5,939,998 | A | 8/1999 | Caporuscio et al. |
| 6,323,704 | B1 * | 11/2001 | Pelley .............. H03K 19/00315 327/333 |
| 6,326,803 | B1 | 12/2001 | Takeda |
| 6,429,683 | B1 | 8/2002 | Miller et al. |

(Continued)

FOREIGN PATENT DOCUMENTS

| CN | 1208479 A | 2/1999 |
| CN | 102545872 A | 7/2012 |

(Continued)

OTHER PUBLICATIONS

International Search Report from International Application No. PCT/US2020/070173, mailed on Oct. 2, 2020, 5 pages.

(Continued)

*Primary Examiner* — Elias Mamo
(74) *Attorney, Agent, or Firm* — TraskBritt (57) ABSTRACT

One or more embodiments relate, generally, to microcontroller input/output (I/O) and limiting or disabling static current draw at general purpose inputs, including during low power situations where a voltage input may be lower than a supply voltage. In some embodiments, a general purpose input may include selectable input buffers and logic that is configured to selectively enable an input buffer associated with a voltage domain substantially the same as an input voltage of the general purpose input, and selectively disable the other input buffers.

18 Claims, 7 Drawing Sheets

(56) References Cited

U.S. PATENT DOCUMENTS

| | | | |
|---|---|---|---|
| 7,023,238 B1* | 4/2006 | Camarota | H03K 19/17744 326/38 |
| 7,098,689 B1* | 8/2006 | Tuan | H03K 19/17784 326/40 |
| 7,295,459 B2 | 11/2007 | Islam | |
| 7,382,168 B2* | 6/2008 | Bhattacharya | H03K 19/018521 326/38 |
| 8,471,803 B2 | 6/2013 | Jeon et al. | |
| 8,633,730 B1* | 1/2014 | Tseng | G06F 1/24 326/38 |
| 8,929,125 B2 | 1/2015 | Keeth et al. | |
| 9,001,578 B2 | 4/2015 | Kim et al. | |
| 9,360,928 B2* | 6/2016 | Pedersen | G06F 1/3296 |
| 9,369,124 B2* | 6/2016 | Gunther | H03K 17/223 |
| 9,865,342 B2 | 1/2018 | Lee | |
| 10,819,318 B1 | 10/2020 | Britton et al. | |
| 2002/0118040 A1 | 8/2002 | Salminen | |
| 2003/0016051 A1 | 1/2003 | El-Ayat | |
| 2003/0048670 A1 | 3/2003 | Confalonieri et al. | |
| 2003/0189847 A1 | 10/2003 | Liu et al. | |
| 2006/0023503 A1 | 2/2006 | Lee | |
| 2006/0261862 A1 | 11/2006 | Baszler et al. | |
| 2007/0075737 A1 | 4/2007 | Schmit et al. | |
| 2008/0084237 A1 | 4/2008 | Behrends et al. | |
| 2008/0204289 A1 | 8/2008 | Miettinen | |
| 2008/0205112 A1 | 8/2008 | Lawson et al. | |
| 2008/0253180 A1 | 10/2008 | Nicolaidis et al. | |
| 2009/0206875 A1 | 8/2009 | Tran et al. | |
| 2009/0303650 A1 | 12/2009 | Do et al. | |
| 2011/0001108 A1 | 1/2011 | Greene et al. | |
| 2011/0176357 A1 | 7/2011 | Koyama et al. | |
| 2011/0241752 A1 | 10/2011 | Wang et al. | |
| 2012/0063211 A1 | 3/2012 | Sharma et al. | |
| 2013/0069905 A1 | 3/2013 | Krah et al. | |
| 2013/0126957 A1 | 5/2013 | Higashitani et al. | |
| 2013/0308373 A1 | 11/2013 | Shukh | |
| 2014/0002162 A1 | 1/2014 | Westwick | |
| 2016/0329098 A1 | 11/2016 | Javerliac et al. | |
| 2016/0351498 A1 | 12/2016 | Chang et al. | |
| 2017/0012627 A1 | 1/2017 | Kapoor et al. | |
| 2018/0101495 A1 | 4/2018 | Mackay et al. | |
| 2018/0268878 A1 | 9/2018 | Ogiwara et al. | |
| 2018/0287614 A1 | 10/2018 | Jo et al. | |
| 2019/0228825 A1 | 7/2019 | Hecht et al. | |
| 2019/0229734 A1 | 7/2019 | Hecht et al. | |
| 2019/0237139 A1 | 8/2019 | McCollum et al. | |
| 2019/0341844 A1* | 11/2019 | Singh | H02M 3/07 |

FOREIGN PATENT DOCUMENTS

| | | |
|---|---|---|
| EP | 0546702 A1 | 6/1993 |
| EP | 0667678 A2 | 8/1995 |
| EP | 1237278 A1 | 9/2002 |
| EP | 3115869 B1 | 5/2018 |
| KR | 2002-0096472 A | 12/2002 |
| WO | 2007/140031 A2 | 12/2007 |
| WO | 2011/062075 A1 | 5/2011 |
| WO | 2017/019715 A1 | 2/2017 |
| WO | 2019/152228 A1 | 8/2019 |

OTHER PUBLICATIONS

International Written Opinion from International Application No. PCT/US2020/070173, mailed on Oct. 2, 2020, 9 pages.

Microchip ATECC608A, CryptoAuthentication(TM) Device Summary Datasheet, DS40001977B (2018) 28 pages.

First Office Action and Search Report of Chinese Patent Application No. 202080046200.4, issued Jul. 23, 2024, 26 pages with English translation.

Second Office Action and Search Report of Chinese Patent Application No. 202080046200.4, issued Feb. 18, 2025, 14 pages with English translation.

* cited by examiner

SELECTABLE INPUT BUFFERS OF GENERAL PURPOSE INPUTS AND MICROCONTROLLERS HAVING THE SAME

CROSS-REFERENCE TO RELATED APPLICATION

This application claims the benefit of the filing date of U.S. Provisional Patent Application No. 62/867,553, filed Jun. 27, 2019, the entire contents and disclosure of which is hereby incorporated herein by this reference.

FIELD

The present disclosure relates, generally, to a general purpose input of a microcontroller, and more specifically, some embodiments relate to selectively disabling static current draw when a general purpose input is at a lower voltage domain than a voltage supply domain of a microcontroller associated with the input.

BACKGROUND

A general purpose input and output (GPIO) pin is an uncommitted digital signal pin in an integrated circuit (IC), such as a microcontroller without limitation. Since a GPIO pin has no predefined purpose, the purpose and behavior of a GPIO pin may be defined and implemented by a designer of a higher level system or circuitry. Typically, a GPIO pin is associated with an input (i.e., a "general purpose input") or an output (i.e., a "general purpose output") and with a specified supply voltage. An external device that interfaces with a microcontroller via a GPIO pin is chosen that operates at a voltage level (e.g., digital voltage levels) close to a supply voltage of the GPIO pin.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings.

DETAILED DESCRIPTION

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Static current is a leakage current that causes static power consumption at a buffer, or more specifically at one or more CMOS (Complementary Metal-Oxide Semiconductor) devices that form the buffer. In the case of a microcontroller, CMOS input buffers are expected (i.e., often assumed) to have 0 ampere static current draw. However, conventional CMOS input buffers known to inventors of this disclosure exhibit such a 0 ampere static current draw when their inputs voltages are at the voltage rails of a microcontroller's supply, or at least within a device threshold of such rails, and when such CMOS input buffers include transistors that have negligible leakage (e.g., leakage current of a CMOS input buffer may be considered 0 amperes if less than 1 Nano Ampere (nA)).

When an external device (e.g., a sensor, a communication port, a bus, without limitation) operates at a lower voltage domain than a voltage domain of a microcontroller's supply voltage, i.e., an input voltage is outside of the device threshold of such voltage rails, (and so lower than a voltage domain of a general purpose input that interfaces the external device to the microcontroller), the inventors of this disclosure now appreciate that an input buffer (e.g., a digital input buffer, a buffer gate, or a tristate buffer more generally, without limitation) of an input may draw a static current, irrespective of the logic state of a signal on the input pin. As a non-limiting example, if a microcontroller's supply voltage is 5 volts and an input voltage received at an input buffer is 1.8 volts (e.g., a high logic state is observed in the voltage domain of the external device), then the input buffer will draw a static current due to the voltage difference between the input voltage and the microcontroller's supply voltage.

An option would be to change the voltage threshold in response to which an input buffer turns on (sometimes referred to as "lowering a trip-point"). Lowering a trip-point of an input buffer may cause static current draw to occur at input voltages closer to the voltage rails, however, the inventors of this disclosure appreciate that lowering a trip-point does not disable static current draw at a buffer when interfacing to a lower voltage domain than the voltage domain of a microcontroller's supply voltage.

As used herein, the terms "no static current draw" and "zero static current draw" should be understood to encompass cases of zero current and cases of an inconsequential static current. Inconsequential may be defined by a threshold and so encompass a static current that is at or below a specified threshold. As non-limiting examples, a specified threshold may be a percentage of a specified sleep current of a device or a specified low power current of a device (e.g., a microcontroller or other integrated circuit, without limitation). As a non-limiting example, for a low power microcontroller in some cases a static current equal to or less than 1% of a device's sleep or low power current may be considered a zero static current.

As used herein, a reference to one or more elements as "selectable" herein means that such elements either collectively, individually, or as a combination, may operate responsive to one or more control signals. As a non-limiting example, selectable elements discussed herein may be enabled or disabled responsive to one or more control signals.

Some embodiments relate, generally, to means for selectively disabling static current draw while a general purpose input of a microcontroller (MCU) is at a lower voltage domain than an MCU's supply voltage domain associated with the general purpose input.

Some embodiments relate, generally, to adjusting voltage rails of a general purpose input of an MCU when interfacing an input voltage domain with a supply voltage domain of an MCU, where the input voltage domain is lower than the MCU's supply voltage domain.

One or more embodiments relate, generally, to a general purpose input of an MCU that includes a first input buffer and a second input buffer. The first input buffer is associated with the general purpose input and is supplied by an MCU supply voltage. The second input buffer is associated with the general purpose input and is supplied by a second supply voltage (e.g., a regulated voltage supply, without limitation) that has a lower voltage domain than a voltage domain of the MCU supply voltage, typically the second supply voltage is substantially equal to the lowest voltage domain of a general purpose input. The first input buffer and the second input buffer share a common input from an input pin pad of the general purpose input. Stated another way, the first input buffer and the second input buffer are each operatively coupled to the pad of the general purpose input.

In one or more embodiments, the first input buffer and a the second input buffer of the general purpose input may be selectively enabled and disabled via control signals, thereby selectively enabling/disabling static current draw at the general purpose input. In one embodiment, information for generating the control signals for enabling/disabling the first input buffer and the second input buffer may be stored at a read/write control register. In one embodiment, a read/write register may be accessible (e.g., by a designer or a host process, without limitation) by way of a register map of an MCU—in other words, a control register may be a memory mapped register. As non-limiting examples, bits of the control register may be operatively coupled to respective enablement inputs of the first and second input buffers, or may be read by digital logic configured to assert/de-assert enablement signals to respective enablement inputs of the input buffers.

In one or more embodiments, a second supply voltage is a regulated supply voltage generated internal to an MCU. As a non-limiting example, a first supply voltage may be regulated to the second supply voltage via an on-board voltage regulator of an MCU.

Figure 1:
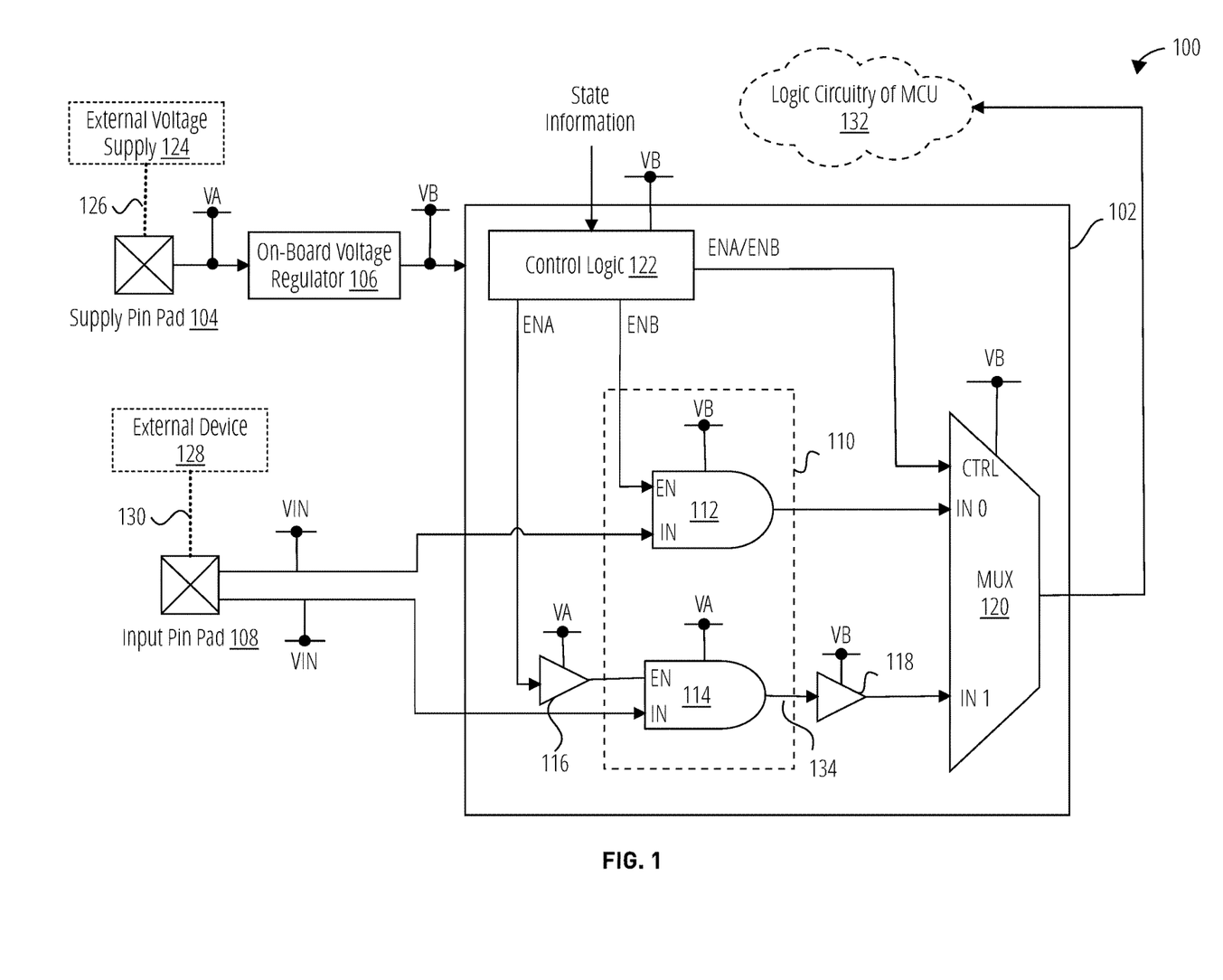
FIG. 1 is a block diagram depicting a general purpose input of a microcontroller, in accordance with one or more embodiments.

FIG. 1 is a schematic diagram depicting a general purpose input 100 of an MCU that includes circuitry configured to selectively disable static current draw at general purpose input 100, in accordance with one or more embodiments. As depicted by FIG. 1, general purpose input 100 may include static current draw cutoff circuit 102, a supply pin pad 104 of a supply pin 126, an input pin pad 108 of an input pin 130, and an on-board voltage regulator 106. As used herein, an "on-board" elements of a device (e.g., an on-board voltage regulator of an MCU, without limitation) is an element that is located at a device, as a non-limiting example, implemented by integrated circuitry of a device in a case of an integrated circuit chip, system or package.

Supply pin pad 104 may be configured for operative coupling via a supply pin 126 to a voltage supply of an MCU that provides a supply voltage $V_A$ (which may be one of many supply voltages of an MCU or a supply voltage of an MCU, without limitation). In the specific example depicted by FIG. 1, supply pin pad 104 is operable for operative coupling to external voltage supply 124, which may be a voltage supply of an MCU that includes general purpose input 100. Supply pin 126 and external voltage supply 124 are depicted by FIG. 1 with a dotted-line to denote they are external to general purpose input 100, and are optional elements of general purpose input 100.

An input of on-board voltage regulator 106 may be operatively coupled to supply pin pad 104 and an output of on-board voltage regulator 106 may be operatively coupled to static current draw cutoff circuit 102 and elements thereof as discussed herein. On-board voltage regulator 106 may be configured to generate and provide a regulated supply voltage $V_B$ in response to supply voltage $V_A$ received at an input of on-board voltage regulator 106. As discussed herein, in some embodiments regulated supply voltage $V_B$ may be a digital supply voltage also characterized herein as a logic voltage level domain.

General purpose input 100 may be configured to provide both supply voltage $V_A$ and regulated supply voltage $V_B$ to static current draw cutoff circuit 102.

Input pin pad 108 may be configured for operative coupling via input pin 130 to external device 128, and more generally configured to facilitate operative coupling of external device 128 to general purpose input 100. It is specifically contemplated that a value of an input voltage $V_{IN}$ at input pin pad 108 will be known or specified and so regulated supply voltage $V_B$ may be chosen to match an input voltage domain of a device operatively coupled to input pin pad 108, namely input voltage $V_{IN}$. Notably, $V_{IN}$ may be lower than $V_B$ as long as $V_{IN}$ is within a threshold voltage of $V_B$. In various embodiments, a value for $V_B$ may be chosen to be within a threshold voltage of the lowest specified voltage of $V_{IN}$.

In one or more embodiments, general purpose input 100 may include circuitry arranged to selectively disable static current draw at general purpose input 100. In one embodiment the circuitry may include static current draw cutoff circuit 102, which is configured, generally, to selectively enable and disable static current draw of general purpose input 100. Static current draw cutoff circuit 102 may include selectable input buffers 110, here two input buffers—first input buffer 112 and second input buffer 114. Control logic 122 may be operatively coupled to respective "enable" inputs EN of first input buffer 112 and second input buffer 114, and to the select input of optional multiplexer (MUX) 120 having inputs IN 0 and IN1 operatively coupled to outputs of first input buffer 112 and second input buffer 114, respectively. Respective inputs IN of first input buffer 112 and second input buffer 114 may be operatively coupled to input pin pad 108. Supply voltage $V_A$ and regulated supply voltage $V_B$ may be provided to static current draw cutoff circuit 102 and components thereof, including power supply inputs of first input buffer 112 and second input buffer 114, respectively.

In some embodiments, control logic 122 may be configured to generate control signals such as assertions/desertions of ENA and ENB, without limitation. In some embodiments, control logic 122 may generate control signals in response to state information such as information about a power mode of a device that includes general purpose input 100.

In a contemplated use case, assume supply voltage $V_A$ is 5 volts and regulated supply voltage $V_B$ is 1.8 volts. Second input buffer 114 is supplied supply voltage $V_A$ first input buffer 112 is supplied with regulated supply voltage $V_B$. Input voltage $V_{IN}$ at input pin pad 108 is 1.8 volts (or within a device threshold of 1.8 volts as discussed above). So, external device 128 operates at a lower voltage domain than the rest of general purpose input 100 (i.e., 1.8 v<5 v), and more specifically, the input voltage $V_{IN}$ at input pin pad 108 is at a lower voltage domain than supply voltage $V_A$. Control logic 122, in response to state information comprising, as non-limiting examples: a supplied control signal (e.g., a control bit of a control register—not shown), enables first input buffer 112 and disables second input buffer 114 (e.g., by de-asserting an enable signal ENA to input EN of second input buffer 114 and asserting an enable signal ENB to input EN of first input buffer 112). More specifically, in one embodiment, control logic 122 disables second input buffer 114 by holding a logic '0' at an input EN of second input buffer 114 responsive to de-assertion of enable signal ENA, and enables first input buffer 112 by asserting and holding a logic '1' at input EN of first input buffer 112 responsive to assertion of enable signal ENB. At first input buffer 112, since $V_{IN}$ and $V_B$ are both 1.8 volts (in practice, $V_{IN}$ may be a little lower than $V_B$ depending on device characteristics, for example, $V_{IN}$ can be within a MOSFET device threshold voltage of $V_B$), there is no static current draw at first input buffer 112. In other words, since $V_{IN}$ is substantially equal to $V_B$, there is no static current draw at first input buffer 112.

MUX 120 is configured to select, and output, one or the other of the outputs of first input buffer 112 and second input buffer 114 provided at respective inputs IN0 and IN1 of MUX 120. In FIG. 1, outputs of first input buffer 112 and second input buffer 114 are operatively coupled to inputs IN0 and IN1 of MUX 120, respectively—in the case of second input buffer 114 via a voltage shifter, here a shift-down buffer 118 that translates the supply voltage level $V_A$ down to the regulated supply voltage level $V_B$, the logic level. The output of MUX 120 may be supplied to the logic circuitry of the MCU 132 (e.g., integrated circuitry, without limitation) and components implemented therein as desired. MUX 120 is controllable via ENA/ENB to select between signals at inputs IN0 and IN1 by, or in response to, the enable/disable second input buffer 114 and/or first input buffer 112 (by e.g., control logic 122, without limitation). In the specific example depicted by FIG. 1, MUX 120 is controllable via control signal ENA/ENB provided by control logic 122, such that when second input buffer 114 is enabled (and first input buffer 112 is disabled), IN1 is selected, and when first input buffer 112 is enabled (and second input buffer 114 is disabled), IN0 is selected. MUX 120 is optional, so in some embodiments not depicted by the figures, outputs of first input buffer 112 and second input buffer 114 may be un-multiplexed and, as a non-limiting example, operatively coupled to the same or different peripherals of an MCU via logic circuitry of MCU 132. Moreover, in some embodiments, it is specifically contemplated that control logic 122 may be configured such that ENA and ENB may both be set equal to 0, disabling both input buffers, in which case MUX 120 may be configured to randomly select one of IN0 and IN1.

In some cases, control logic 122, MUX 120 and/or the logic circuitry of MCU 132 may operate at a voltage domain substantially at regulated supply voltage $V_B$, as a non-limiting example, when $V_B$ is substantially equal to logic voltage level of the MCU. Stated another way, second input buffer 114 may interface with an external device 128 that operates at a higher voltage domain than the voltage domain of the integrated circuitry of an MCU including general purpose input 100. In some embodiments, general purpose input 100 may include first and second voltage shifters, here, shift-up buffer 116 and shift-down buffer 118, on a path that includes second input buffer 114. Shift-up buffer 116 is configured to shift signal ENA provided by control logic 122 in a voltage domain commensurate with regulated supply voltage $V_B$ (e.g., a logic voltage level) to a voltage level commensurate with supply voltage $V_A$. Shift-down buffer 118 is configured to shift the digitized result 134 output by second input buffer 114 from a level that is in a voltage domain commensurate with supply voltage $V_A$ to a level commensurate with regulated supply voltage $V_B$ appropriate for MUX 120 (e.g., a logic voltage level). Shift-up-buffer 116 is thus arranged on an enable input path of second input buffer 114 and shift-down-buffer is thus arranged on an output path of second input buffer 114.

Using an alternative case as an example to illustrate a contemplated operation of shift-up buffer 116 and shift-down buffer 118, if control logic 122 enables second input buffer 114 instead of first input buffer 112 while Vin=1.8 V and supply voltage $V_A$ is 5 V, the voltage supplied to shift-up buffer 116 is $V_A$, and so shift-up buffer 116 outputs a 5 volt signal in response to a logic '1' supplied by control logic 122 on signal ENA (in this example logic '1' on signal ENA is about 1.8 V, which is above a trip-point of shift-up buffer 116). A 5 volt signal at enable input EN and a 1.8 volt signal (i.e., Vin) at input IN of second input buffer 114 is sufficient to trip second input buffer 114, which also outputs a 5 volt signal because it is supplied by supply voltage $V_A$. The output of second input buffer 114 is provided to an input of shift-down buffer 118, which is configured to output a 1.8 volt signal (i.e., the level of commensurate with regulated supply voltage $V_B$ in this example) in response to receiving a 5 volt signal from second input buffer 114.

Notably, in this alternative case, while Vin (1.8 v) is high enough to trip second input buffer 114, the difference between $V_A$ and $V_{IN}$ is sufficient to cause static current draw at second input buffer 114, as long as signal ENA is asserted. When signal ENA is de-asserted, there is no static current draw at second input buffer 114.

Some embodiments relate, generally to a multi-voltage MCU where one or more general purpose inputs (GPI(s)) are associatable with a first voltage domain (e.g., a supply voltage domain of an MCU, without limitation) and one or more general purpose inputs are associatable with a second voltage domain that is lower than the first voltage domain.

Figure 2:
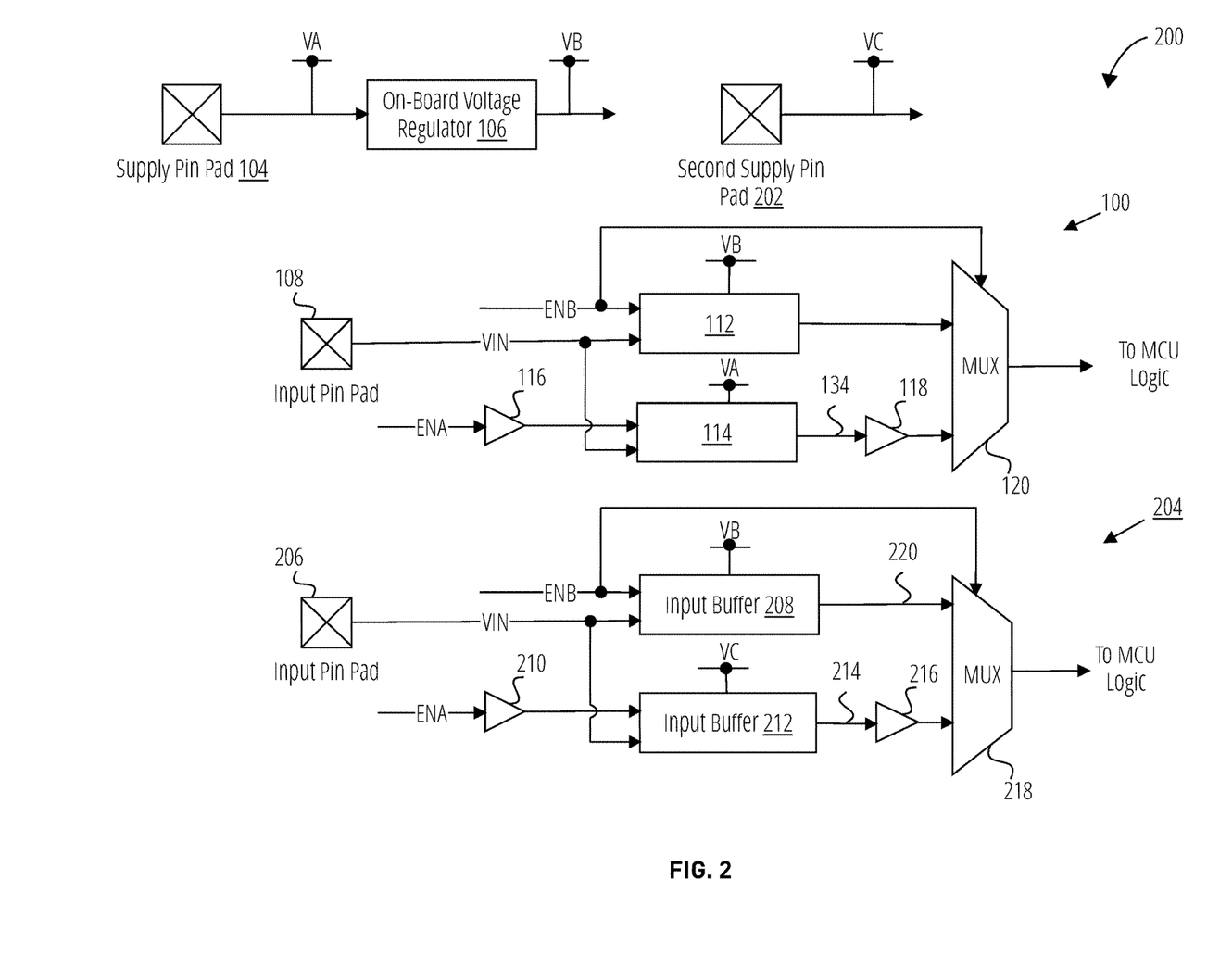
FIG. 2 is a block diagram depicting general purpose inputs of a multi-voltage microcontroller system, in accordance with one or more embodiments.

FIG. 2 shows a schematic diagram of a general purpose inputs 200 of a multi-voltage microcontroller system, in accordance with one or more embodiments. In the specific example depicted by FIG. 2, the general purpose inputs 200 of a multi-voltage microcontroller system include general purpose input 100 discussed with reference to FIG. 1 above, although for brevity, control logic 122 and external voltage supply 124 are not depicted. General purpose inputs 200 also includes a second general purpose input 204 associated, at least in part, with a different voltage domain than general purpose input 100, namely, voltage domain $V_C$. Input buffer 208 is supplied by regulated supply voltage $V_B$ and input buffer 212 is supplied by supply voltage $V_C$.

Second general purpose input 204 includes an input pin pad 206 operatively coupled to respective inputs of input buffer 208 and input buffer 212. When input buffer 212 is enabled by enablement signals ENA/ENB, shift-up buffer 210 converts a digital enable signal ENA from the logic voltage level of regulated supply voltage $V_B$ to the voltage level of supply voltage $V_C$ (the voltage domain of input buffer 212) and provides shifted-up ENA to an enable input of input buffer 212. Input voltage $V_{IN}$ is received at a respective input pin of input buffer 212, and in response to $V_{IN}$ and shifted-up ENA, input buffer 212 provides digitized result 214 at voltage domain $V_C$. Digitized result 214 is received at shift-down buffer 216, which converts digitized result 214 to a voltage domain of regulated supply voltage $V_B$, here the logic level voltage domain of the MCU, and provides (now shifted-down) digitized result 214 to multiplexer 218.

When input buffer 208 is enabled by enablement signal ENB provided to an enable input of input buffer 208, an input voltage $V_{IN}$ is received at a respective input of input buffer 208, and input buffer 208 outputs a digitized result 220 at voltage domain of regulated supply voltage $V_B$. The digitized result 220 is provided to multiplexer 218. Multiplexer 218 selects one of the inputs having the digitized result 214 or digitized result 220 in response to enablement signals ENA/ENB and provides the signal at its selected input to MCU logic.

Notably, general purpose input 100 and general purpose input 204 have a common digital voltage supply, the regulated voltage $V_B$. $V_B$ is dependent on $V_A$ and so general purpose input 204 can select between a supply voltage $V_C$ and a regulated supply voltage $V_B$ that is not dependent on supply voltage $V_C$. Stated another way, $V_C$ and $V_B$ are independent, which gives the system more flexibility.

The specific arrangement for supply of $V_A$, $V_B$, and $V_C$ depicted by FIG. 2—supply voltage $V_A$ regulated to regulated supply voltage $V_B$ and supply voltage $V_C$ (and any additional supply voltages)—is exemplary and other arrangements are encompassed by this description. As non-limiting examples, one or more of supply voltages $V_A$, $V_B$, and $V_C$ may be supplied by a switch network. As a further non-limiting example, regulated supply voltage $V_B$, may be selected from among multiple on-board voltage regulators (e.g., by a multiplexer, without limitation). As a further non-limiting example, supply voltages $V_A$ and $V_B$ may both be regulated from another supply voltage by an on-board voltage regulator that is configured to regulate the other supply voltage to provide supply voltage $V_A$ during a first mode and to regulate the other supply voltage to provide regulated supply voltage $V_B$ during a second mode.

Notably, voltage shifters associated with an input buffer supplied by $V_C$ (e.g., input buffer 212) may be configured to shift to voltage level $V_C$ regardless of whether voltage level $V_C$ is above or below voltage level $V_B$. So, what is generally referred to in the discussion above as a voltage upshift of ENA signal when $V_C$ is above $V_B$ may be generally referred to as a voltage downshift in a case where $V_C$ is below $V_B$. Any suitable circuit and/or device known to a person having ordinary skill in the art may be used for voltage shifting. As non-limiting examples, dedicated up and down voltage shifters may be used as well as up/down shifters that operate without regard to which voltage domain is higher or lower.

As discussed herein, in some embodiments control signals for setting a voltage domain of GPIs and thereby selectively disabling static current draw may be determined and/or generated in response to one or more user specified parameters (i.e., a user of the GPI). Such user specified parameters may be provided, as non-limiting examples, in response detecting coupling of an external device to an input pin pad that has a lower voltage domain than a supply voltage domain of an MCU in response to a power management protocol, or in response to other settings.

Figure 3:
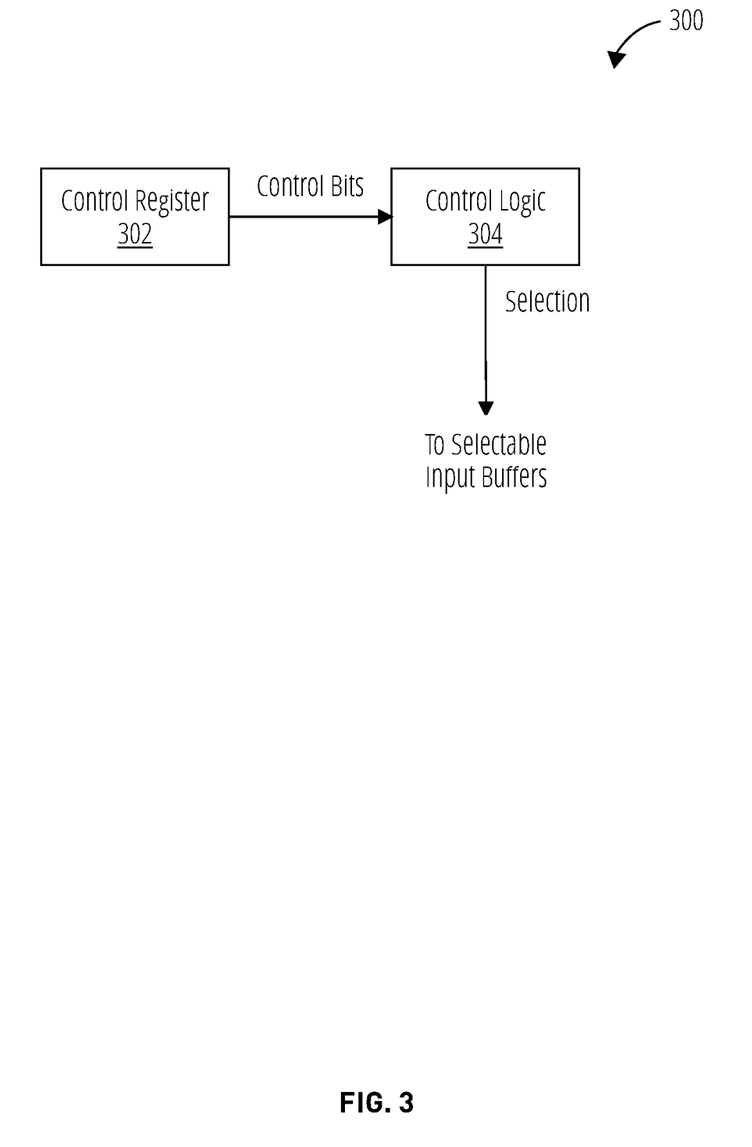
FIG. 3 is a block diagram depicting a system for determining and/or generating control signals for setting a voltage domain of a general purpose input, in accordance with one or more embodiments.

FIG. 3 is a block diagram depicting a system 300 for determining and/or generating control signals (e.g., ENA, and ENB, without limitation) for setting a voltage domain of a GPI e.g., general purpose input 100 or general purpose inputs 200, without limitation, in accordance with one or more embodiments. As depicted by FIG. 3, system 300 may include a control register 302 and a control logic 304.

Control register 302 may be configured to store one or more control bits indicative of a voltage domain, and, in a contemplated operation, control logic 304 may be configured to read control bits of control register 302, determine a control signal responsive to read control bits, and provide a control signal Selection to selectable input buffers of a GPI. In the cases discussed with reference to FIG. 1 and FIG. 2, Selection may include enablement signals ENA/ENB. In one embodiment, the control bits stored at control register 302 and read by control logic 304 may be user-specified, as a non-limiting example, during setup of a GPI or in real-time.

Figure 4:
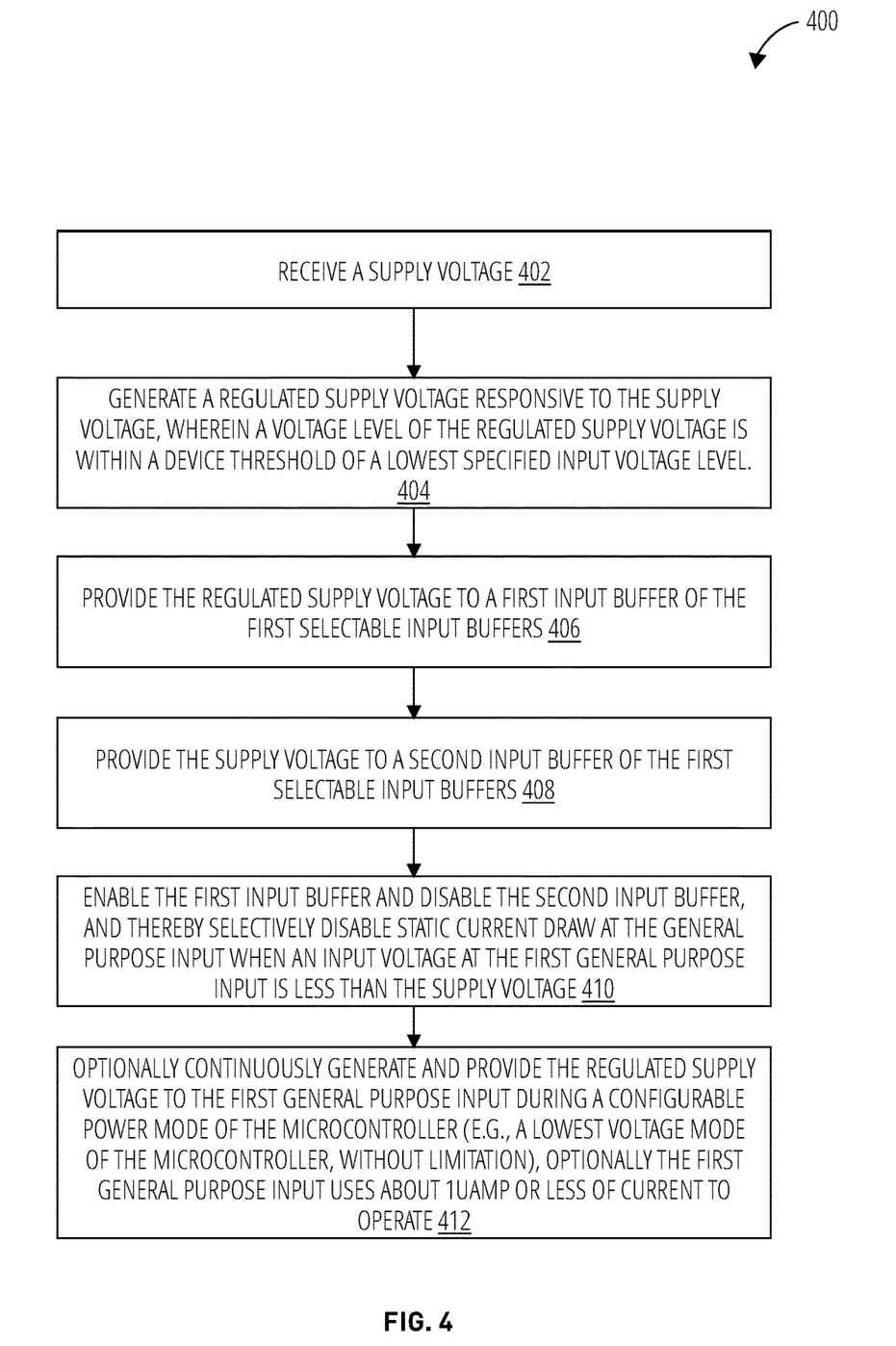
FIG. 4 is a flowchart depicting a process, in accordance with one or more embodiments.

FIG. 4 is a flowchart depicting a process 400 for selectively disabling static current draw at a general purpose input of an MCU, in accordance with one or more embodiments.

In operation 402, process 400 receives a supply voltage. In some embodiments, the supply voltage is generated by an external voltage supply (e.g., external voltage supply 124, without limitation) and received via a supply pin of an MCU (e.g., supply pin 126 or a pin operable for operative coupling to a supply pin such as supply pin pad 202, 502, 504, or 506, without limitation). In other embodiments the supply voltage may be regulated from an external supply voltage received at an MCU.

In operation 404, process 400 generates a regulated supply voltage responsive to the supply voltage. In some embodiments, a voltage regulator (e.g., on-board voltage regulator 106 or on-board voltage regulator 508, without limitation) generates the regulated supply voltage. A voltage level of the regulated supply voltage is within a device threshold of a lowest specified input voltage (e.g., a device threshold of a device (e.g., a MOSFET transistor, without limitation) of an input buffer 112, 208, or 518, without limitation).

In operation 406, process 400 provides the regulated supply voltage to a first input buffer (e.g., first input buffer 112, input buffer 208, or input buffer 518, without limitation) of a first general purpose input.

In operation 408, process 400 provides the supply voltage to a second input buffer (e.g., second input buffer 114, without limitation) of the first selectable input buffers of the first general purpose input.

In operation 410, process 400 enables the first input buffer and disables the second input buffer, and thereby selectively disable static current draw at the general purpose input when an input voltage at the first general purpose input is less than the first supply voltage. In some embodiments, control logic (e.g., control logic 122, without limitation) may generate enablement signals that enable the first input buffer and disable the second input buffer and thereby selectively disable static current draw at the first general purpose input.

In operation 412, process 400 may optionally continuously supply (i.e., generate and provide) the regulated supply voltage during a lowest voltage configurable sleep mode of the microcontroller. In some embodiments, the voltage regulator that generates the regulated supply voltage in operation 406 continuously supplies the regulated supply voltage. In some embodiments, the general purpose input uses about 1 microampere (uA) or less of current to operate while a microcontroller including the general purpose input is in a lowest voltage mode. More specifically, an onboard voltage regulator may use about 1 uA or less to generate a regulated supply voltage provided to the general purpose input during the lowest voltage mode.

Figure 5:
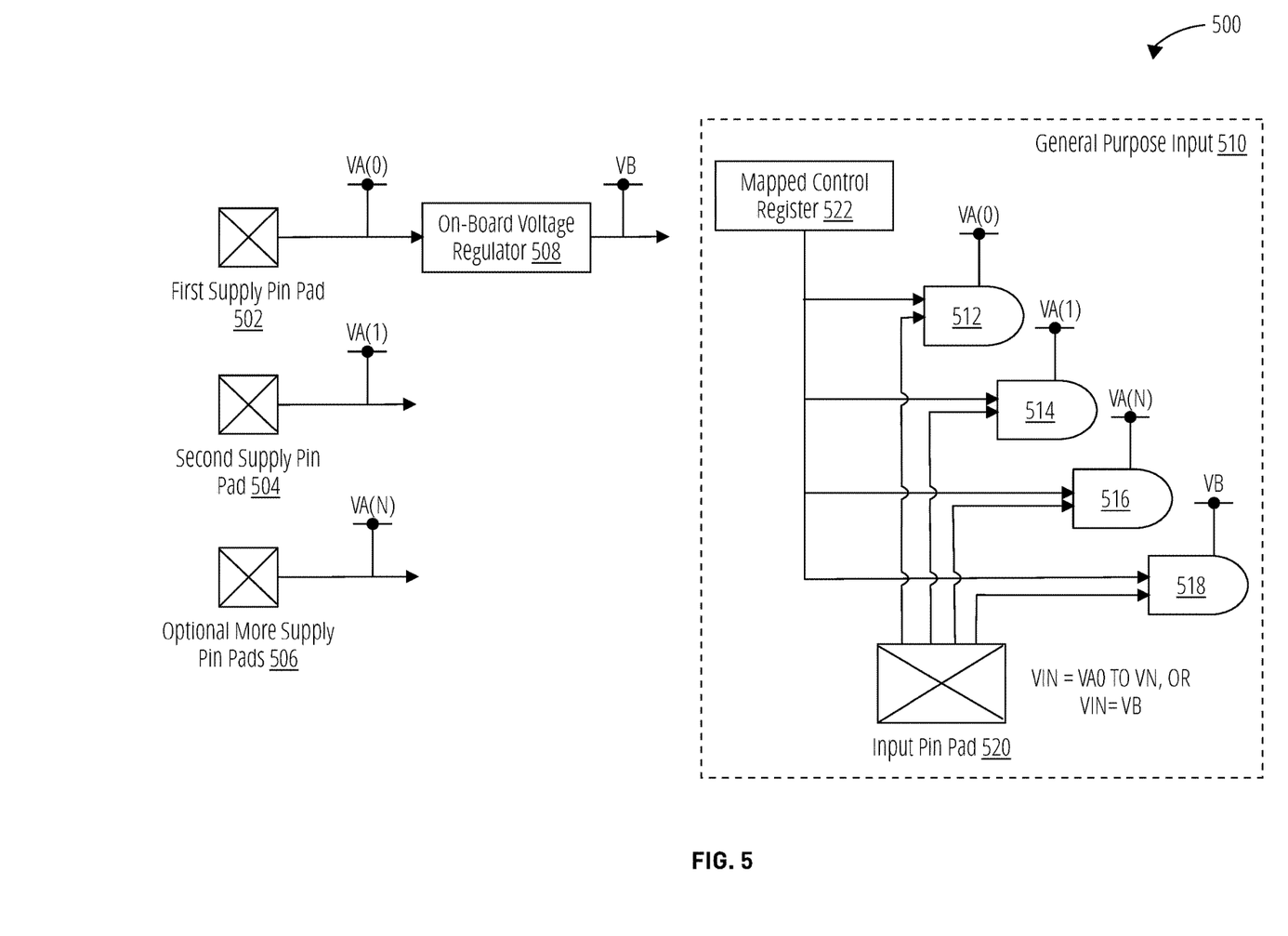
FIG. 5 is a block diagram depicting a multi-voltage sourced microcontroller, in accordance with one or more embodiments.

FIG. 5 is a schematic diagram of a multi-voltage sourced microcontroller 500, in accordance with one or more embodiments. Arrangements depicted by FIG. 1 and FIG. 2 may be characterized as single-voltage sourced and multi-voltage sourced, respectively, because they include a single supply pin pad 104 and dual supply pin pads 104 and 202, respectively.

Multi-voltage sourced microcontroller 500 includes first supply pin pad 502, second supply pin pad 504, and optional more supply pin pads 506 operable for operative couplings to individual voltage supply sources, here the voltage supply sources including a first voltage supply, a second voltage supply and an Nth voltage supply providing supply voltages VA(0), VA(1) to VA(N), respectively. At least one of the supply pin pads is operatively coupled to a voltage regulator, here, voltage regulator 508, which is configured to generate regulated supply voltage $V_B$ responsive to supply voltage VA(0).

Multi-voltage sourced microcontroller 500 may be configured to provide supply voltages VA(0), VA(1) to VA(N) and regulated supply voltage $V_B$ to general purpose input 510, and to respective individual input buffers: input buffer 512, input buffer 514, input buffer 516, and input buffer 518. Input pin pad 520 is operatively coupled to an input of each of input buffer 512, input buffer 514, input buffer 516 and input buffer 518. Each of input buffer 512, input buffer 514, input buffer 516, and input buffer 518 may be controlled via control signals received at respective enable inputs operatively coupled to mapped control register 522. While not depicted by FIG. 5, the respective control signal paths between mapped control register 522 and the input buffers may include voltage shifting circuitry, e.g., shift-up buffer 116 and shift-down buffer 118, without limitation.

In operation, mapped control register 522 is arranged to enable a respective one of input buffer 512, input buffer 514, input buffer 516, and input buffer 518 whose supply voltage is commensurate with the voltage of input signal received at, or expected to be received at input pin pad 520, and disable the other ones of input buffer 512, input buffer 514, input buffer 516, and input buffer 518 so as to prevent static current draw. Mapped control register 522 is further arranged to disable input buffer 512, input buffer 514, and input buffer 516 and enable input buffer 518 when $V_{IN}$ is less than VA(0) to VA(N) and thereby disable static current draw at general purpose input 510.

In one or more embodiments, an on-board voltage regulator such as on-board voltage regulator 106, and on-board voltage regulator 508, without limitation, may be configured to continuously generate a regulated supply voltage disclosed herein. As a non-limiting example, such an on-board voltage regulator may be an "always on" type voltage regulator for providing a regulated supply voltage to at least some integrated circuitry of an MCU including integrated circuitry other than a general purpose input or selectable input buffers more generally.

In one or more embodiments, such an on-board voltage regulator may be configured to continuously generate a regulated supply voltage in response to a current source that is specified at least partially based on a lowest power consumption or other desired power consumption of a device that includes the on-board voltage regulator. In one or more embodiments, a lowest power consumption may correspond to a sleep mode or to lowest power mode of a device that includes the on-board voltage regulator. As a non-limiting example, a regulated supply voltage may be generated from 1 uA current or less due to power consumption limits during a specific power mode of a device, and thereby power a general purpose input (e.g., general purpose input 100 or 204, without limitation) using 1 uA current or less.

Using an always on type voltage regulator may be convenient because, among other reasons, MCU's often include such a voltage regulator for other purposes than supplying a general purpose input. Notably, a person having ordinary skill in the art will recognize many suitable arrangements for generating a regulated supply voltage encompassed by disclosed embodiments, including without limitation an on-board voltage regulator or an external voltage regulator that supplies a regulated supply voltage via a regulated supply voltage pin of an MCU.

A person having ordinary skill in the art will recognize many advantages and uses for described embodiments. One such use case is for valid activity detection at general purpose input while a device is in a low power mode of operation. Static current draw might deplete a power source such as a battery or cause a device to operate outside a specification for low power.

Figure 6:
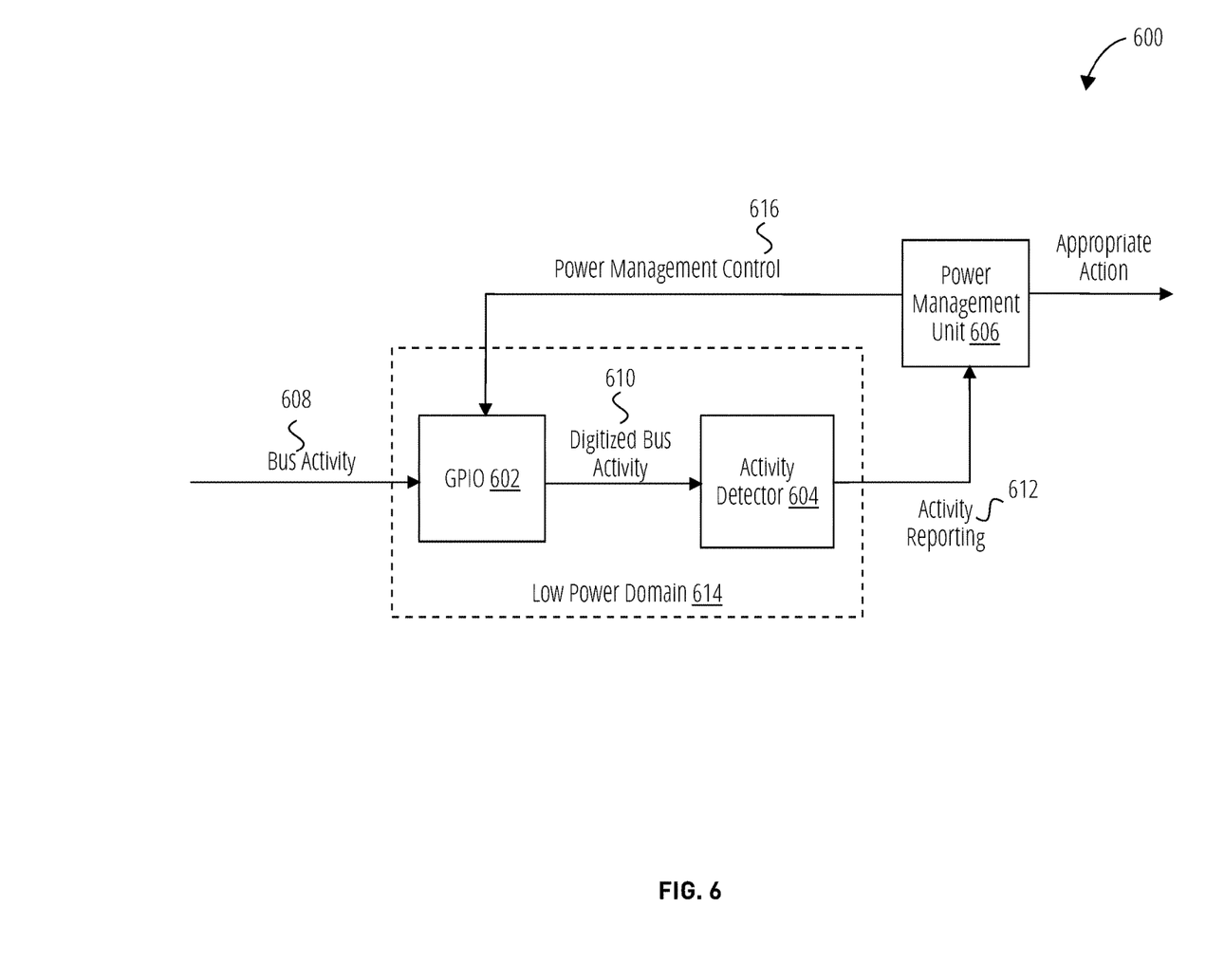
FIG. 6 is a block diagram depicting a wake circuit, in accordance with one or more embodiments.

FIG. 6 is a block diagram depicting a wake circuit 600 for operative coupling to a transmission medium such as a coaxial cable or twisted pair for an Ethernet bus, without limitation, via GPIO 602. GPIO 602 may be or include a general purpose input 100, without limitation.

GPIO 602 and activity detector 604 can operate in a low power domain 614 associated with a low power mode or an operational domain, such as when transmitting and receiving data over the bus. When in a low power mode, power management unit 606 configures GPIO 602 via control signal power management control 616 to disable static current draw. By way of non-limiting example, the control signal power management control 616 may comprise ENA and ENB for disabling second input buffer 114 and enabling first input buffer 112 of FIG. 1, and thereby disabling static current draw at GPIO 602 while operating in low power mode. While in low power mode, GPIO 602 may receive bus activity 608 (e.g., voltage levels, without limitation) and provide digitized versions of those signals, as digitized bus activity 610, to activity detector 604. Activity detector 604 is configured to detect valid bus activity (e.g., voltage levels within a threshold or having a sufficient duration, without limitation) and provide activity reporting signal 612 to inform power management unit 606 that valid bus activity has been detected. Power management unit 606, in response to activity reporting signal 612 indicating valid bus activity, may take appropriate action, including without limitation, turning on supply of power to a device that includes wake circuit 600 and configuring GPIO 602 for an operational power mode via control signal power management control 616.

Figure 7:
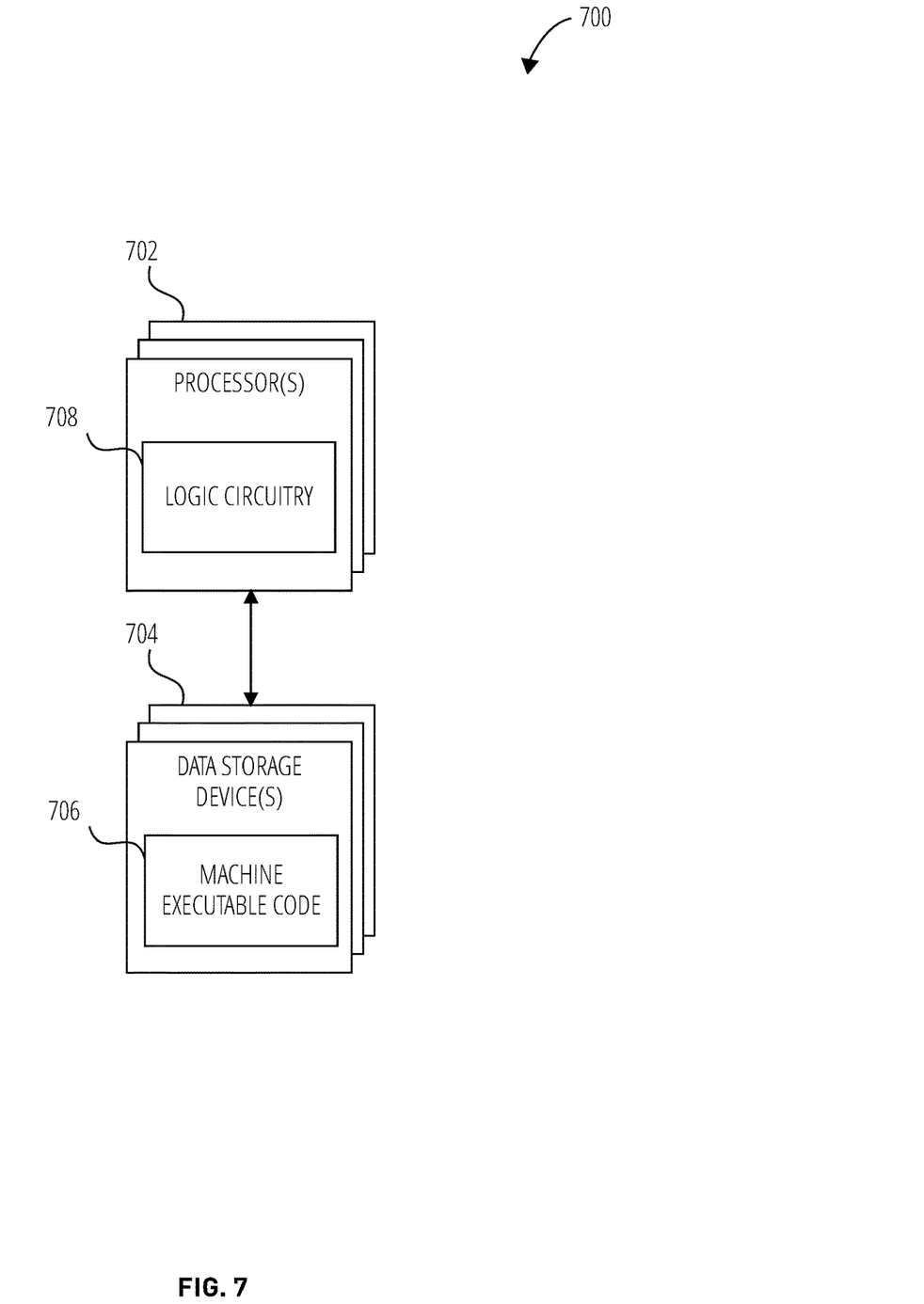
FIG. 7 is a block diagram depicting a circuitry that may be used to implement various functions, operations, acts, processes, and/or methods, in accordance with one or more embodiments.

FIG. 7 is a block diagram depicting a circuitry 700 that, in some embodiments, may be used to implement various functions, operations, acts, processes, and/or methods disclosed herein. The circuitry 700 includes one or more processors 702 (sometimes referred to herein as "processors 702") operatively coupled to one or more apparatuses such as data storage devices (sometimes referred to herein as "storage 704"), without limitation. The storage 704 includes machine executable code 706 stored thereon (e.g., stored on a computer-readable memory) and the processors 702 include logic circuitry 708. The machine executable code 706 include information describing functional elements that may be implemented by (e.g., performed by) the logic circuitry 708. The logic circuitry 708 is adapted to implement (e.g., perform) the functional elements described by the machine executable code 706. The circuitry 700, when executing the functional elements described by the machine executable code 706, should be considered as special purpose hardware configured for carrying out functional elements disclosed herein. In some embodiments the processors 702 may be configured to perform the functional elements described by the machine executable code 706 sequentially, concurrently (e.g., on one or more different hardware platforms), or in one or more parallel process streams.

When implemented by logic circuitry 708 of the processors 702, the machine executable code 706 is configured to adapt the processors 702 to perform operations of embodiments disclosed herein. For example, the machine executable code 706 may be configured to adapt the processors 702 to perform at least a portion or a totality of the operations discussed for general purpose input 100, general purpose inputs 200, system 300, multi-voltage sourced microcontroller 500, and wake circuit 600, without limitation.

As a specific, non-limiting example, the machine executable code may be configured to instruct the processors 702 to perform at least some functions of general purpose input 100, general purpose inputs 200, system 300, process 400, microcontroller 500, and wake circuit 600, without limitation.

The processors 702 may include a general purpose processor, a special purpose processor, a central processing unit (CPU), an MCU, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code) related to embodiments of the present disclosure. It is noted that a general-purpose processor (may also be referred to herein as a host processor or simply a host) may be a microprocessor, but in the alternative, the processors 702 may include any conventional processor, controller, microcontroller, or state machine. The processors 702 may also be implemented as a combination of computing devices, such as a combination of a DSP and a microprocessor, a plurality of microprocessors, one or more microprocessors in conjunction with a DSP core, or any other such configuration.

In some embodiments the storage 704 includes volatile data storage (e.g., random-access memory (RAM), without limitation), non-volatile data storage (e.g., Flash memory, a hard disc drive, a solid state drive, erasable programmable read-only memory (EPROM), without limitation). In some embodiments the processors 702 and the storage 704 may be implemented into a single device (e.g., a semiconductor device product, a system on chip (SOC), without limitation). In some embodiments the processors 702 and the storage 704 may be implemented into separate devices.

In some embodiments the machine executable code 706 may include computer-readable instructions (e.g., software code, firmware code, without limitation). By way of non-limiting example, the computer-readable instructions may be stored by the storage 704, accessed directly by the processors 702, and executed by the processors 702 using at least the logic circuitry 708. Also by way of non-limiting example, the computer-readable instructions may be stored on the storage 704, transmitted to a memory device (not shown) for execution, and executed by the processors 702 using at least the logic circuitry 708. Accordingly, in some embodiments the logic circuitry 708 includes electrically configurable logic circuitry 708.

In some embodiments the machine executable code 706 may describe hardware (e.g., circuitry) to be implemented in the logic circuitry 708 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine executable code 706 may include an HDL, an RTL, a GL description, a mask level description, other hardware description, or any combination thereof.

In embodiments where the machine executable code 706 includes a hardware description (at any level of abstraction), a system (not shown, but including the storage 704) may be configured to implement the hardware description described by the machine executable code 706. By way of non-limiting example, the processors 702 may include a programmable logic device (e.g., an FPGA or a PLC) and the logic circuitry 708 may be electrically controlled to implement circuitry corresponding to the hardware description into the logic circuitry 708. Also by way of non-limiting example, the logic circuitry 708 may include hard-wired logic manufactured by a manufacturing system (not shown, but including the storage 704) according to the hardware description of the machine executable code 706.

Regardless of whether the machine executable code 706 includes computer-readable instructions or a hardware description, the logic circuitry 708 is adapted to perform the functional elements described by the machine executable code 706 when implementing the functional elements of the machine executable code 706. It is noted that although a hardware description may not directly describe functional elements, a hardware description indirectly describes functional elements that the hardware elements described by the hardware description are capable of performing.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure may include:

Embodiment 1: A general purpose input of a microcontroller, the general purpose input comprising: an input pin pad configured for operative coupling to a device external to a microcontroller; and a circuitry arranged to selectively disable static current draw at the general purpose input.

Embodiment 2: The general purpose input according to Embodiment 1, further comprising: a supply pin pad configured for operative coupling to a voltage supply of the microcontroller.

Embodiment 3: The general purpose input according to any of Embodiments 1 and 2, wherein the voltage supply of the microcontroller is an external voltage supply.

Embodiment 4: The general purpose input according to any of Embodiments 1 through 3, wherein the circuitry arranged to selectively disable static current draw at the general purpose input is configured to disable static current draw when an input voltage at the input pin pad is lower than a supply voltage of the voltage supply of the microcontroller.

Embodiment 5: The general purpose input according to any of Embodiments 1 through 4, wherein the voltage supply is for a logic circuitry of the microcontroller.

Embodiment 6: The general purpose input according to any of Embodiments 1 through 5, further comprising an on-board voltage regulator, the on-board voltage regulator comprising: an input, the input operatively coupled to the supply pin pad; and an output, the output operatively coupled to the circuitry arranged to selectively disable static current draw.

Embodiment 7: The general purpose input according to any of Embodiments 1 through 6, wherein the circuitry arranged to selectively disable static current draw at the general purpose input is configured to disable static current draw responsive to control signals.

Embodiment 8: A microcontroller, comprising: one or more general purpose inputs; and a first selectable input buffers of a first general purpose input of the one or more general purpose inputs, wherein a first input buffer of the first selectable input buffers is selectable to disable static current draw at the first general purpose input when an input voltage at the first general purpose input is less than a supply voltage.

Embodiment 9: The microcontroller according to Embodiment 8, further comprising a second input buffer of the first selectable input buffers of the first general purpose input.

Embodiment 10: The microcontroller according to any of Embodiments 8 and 9, further comprising: a control logic of the first general purpose input, the control logic configured to provide control signals for enabling one of the first input buffer and the second input buffer.

Embodiment 11: The microcontroller according to any of Embodiments 8 through 10, further comprising: a control register operatively coupled to respective enable inputs of the first input buffer and the second input buffer.

Embodiment 12: The microcontroller according to any of Embodiments 8 through 11, further comprising: a first voltage shifter arranged on an enable input path of the second input buffer; and a second voltage shifter arranged on an output path of the second input buffer.

Embodiment 13: The microcontroller according to any of Embodiments 8 through 12, wherein the first voltage shifter is arranged to adjust a control signal to a voltage level of the second input buffer, and the second voltage shifter is arranged to adjust an output signal of the second input buffer to the logic voltage level.

Embodiment 14: The microcontroller according to any of Embodiments 8 through 13, further comprising: a voltage regulator of the first general purpose input, wherein an input of the voltage regulator is operatively coupled to a supply pin pad and an output of the voltage regulator is operatively coupled to the first input buffer.

Embodiment 15: The microcontroller according to any of Embodiments 8 through 14, wherein the voltage regulator is configured to receive the supply voltage and provide a regulated supply voltage responsive to the supply voltage.

Embodiment 16: The microcontroller according to any of Embodiments 8 through 15, wherein the voltage regulator is configured to continuously generate and provide the regulated supply voltage during a lowest voltage mode.

Embodiment 17: The microcontroller according to any of Embodiments 8 through 16, wherein the voltage regulator is configured to generate the regulated supply voltage within a device threshold voltage of a lowest specified input voltage.

Embodiment 18: The microcontroller according to any of Embodiments 8 through 17, wherein the voltage regulator is an on-board voltage regulator.

Embodiment 19: A microcontroller, comprising: a first supply pin pad; a second supply pin pad; and a general purpose input, the general purpose input comprising: a first input buffer operatively coupled to the first supply pin pad; a second input buffer operatively coupled to the second supply pin pad; a third input buffer operatively coupled to a voltage regulator; and a mapped control register, wherein enable inputs of the first, second, and third input buffers are operatively coupled to the mapped control register.

Embodiment 20: The microcontroller according to Embodiment 19, wherein the general purpose input comprises an input pin pad, the input pin pad operatively coupled to the first input buffer, the second input buffer and the third input buffer.

Embodiment 21: A method, comprising: receiving a supply voltage, providing the supply voltage to first selectable input buffers of a first general purpose input; generating a regulated supply voltage responsive to the supply voltage; providing the regulated supply voltage to a first input buffer of the first selectable input buffers; providing the supply voltage to a second input buffer of the first selectable input buffers; and selecting the first input buffer and thereby selectively disable static current draw at the first general purpose input when an input voltage at the first general purpose inputs is less than the supply voltage.

While the present disclosure has been described herein with respect to certain illustrated embodiments, those of ordinary skill in the art will recognize and appreciate that the present disclosure is not so limited. Rather, many additions, deletions, and modifications to the illustrated and described embodiments may be made without departing from the scope of the invention as hereinafter claimed along with their legal equivalents. In addition, features from one or more embodiments may be combined with features of one or more other embodiments while still being encompassed within the scope of the disclosure as contemplated by the inventors.

We claim:

1. A general purpose input of a microcontroller, the general purpose input comprising:
   an input pin pad for operative coupling to a device external to a microcontroller;
   a supply pin pad for operative coupling to a voltage supply to continuously power the general purpose input during multiple power states of the microcontroller; and
   a circuitry to selectively disable static current draw at the general purpose input via enablement/disablement of two or more input buffers of the general purpose input, wherein the circuitry to selectively disable static current draw at least partially responsive to an input voltage at the input pin pad being lower than a supply voltage at the supply pin pad.

2. The general purpose input of claim 1, wherein the voltage supply is an external voltage supply.

3. The general purpose input of claim 1, further comprising
   an on-board voltage regulator, the on-board voltage regulator comprising:
   an input, the input operatively coupled to the supply pin pad; and
   an output, the output operatively coupled to the circuitry arranged to selectively disable static current draw.

4. The general purpose input of claim 1, wherein the circuitry arranged to selectively disable static current draw at the general purpose input is to disable static current draw responsive to control signals.

5. A microcontroller, comprising:
   one or more general purpose inputs; and
   a first input buffer of a first general purpose input of the one or more general purpose inputs, wherein an operative state of the first input buffer includes at least a first operative state and a second operative state, wherein the second operative state of the first input buffer is selectable, via an enable input of the first input buffer, to disable static current draw at the first general purpose input at least partially responsive to an input voltage at the first general purpose input being less than a supply voltage,
   wherein a first operative state of the first input buffer is associated with an input of the first input buffer being enabled, and a second operative state of the first input buffer is associated with the input of the first input buffer being disabled.

6. The microcontroller of claim 5, further comprising a second input buffer of the first general purpose input.

7. The microcontroller of claim 6, further comprising:
   a control logic of the first general purpose input, the control logic to provide control signals for enabling one of the first input buffer and the second input buffer.

8. The microcontroller of claim 7, further comprising:
   a control register operatively coupled to respective enable inputs of the first input buffer and the second input buffer.

9. The microcontroller of claim 6, further comprising:
   a first voltage shifter arranged on an enable input path of the second input buffer; and
   a second voltage shifter arranged on an output path of the second input buffer.

10. The microcontroller of claim 9, wherein the first voltage shifter is arranged to adjust a control signal to a voltage level of the second input buffer, and the second voltage shifter is arranged to adjust an output signal of the second input buffer to a logic voltage level.

11. The microcontroller of claim 6, further comprising:
    a voltage regulator of the first general purpose input, wherein an input of the voltage regulator is operatively coupled to a supply pin pad and an output of the voltage regulator is operatively coupled to the first input buffer.

12. The microcontroller of claim 11, wherein the voltage regulator is arranged to receive the supply voltage and provide a regulated supply voltage responsive to the supply voltage.

13. The microcontroller of claim 12, wherein the voltage regulator is to continuously generate and provide the regulated supply voltage during a lowest voltage mode.

14. The microcontroller of claim 12, wherein the voltage regulator is to generate the regulated supply voltage within a device threshold voltage of a lowest specified input voltage.

15. The microcontroller of claim 12, wherein the voltage regulator is an on-board voltage regulator.

16. A microcontroller, comprising:
    a first supply pin pad;
    a second supply pin pad; and
    a general purpose input, the general purpose input comprising:
    a first input buffer operatively coupled to the first supply pin pad;
    a second input buffer operatively coupled to the second supply pin pad;
    a third input buffer operatively coupled to a voltage regulator; and
    a mapped control register, and
    wherein enable inputs of the first, second, and third input buffers are operatively coupled to the mapped control register.

17. The microcontroller of claim 16, wherein the general purpose input comprises an input pin pad, the input pin pad operatively coupled to the first input buffer, the second input buffer and the third input buffer.

18. A method, comprising:
    receiving a supply voltage;
    generating a regulated supply voltage responsive to the supply voltage;
    providing the regulated supply voltage to a first input buffer of a first selectable input buffer;
    providing the supply voltage to a second input buffer of the first selectable input buffer; and
    while continuously providing the regulated supply voltage, selecting to enable the second input buffer and disable the first input buffer and thereby selectively disable static current draw at a first general purpose input at least partially responsive to an input voltage at the first general purpose input being less than the supply voltage.

* * * * *